Figure 1:
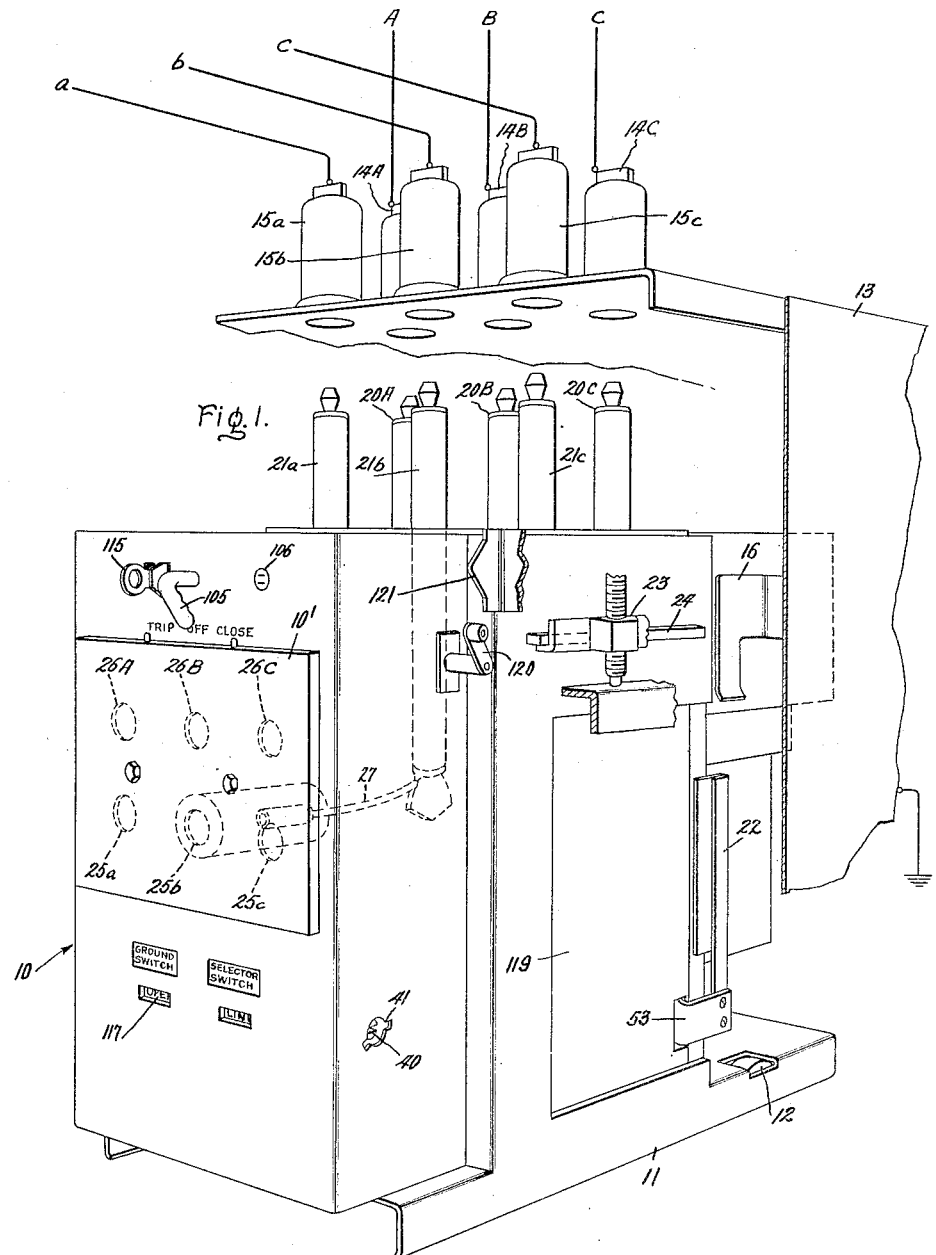

June 10, 1952 H. KRIDA 2,600,304
SUBSTITUTE UNIT FOR CIRCUIT TESTING AND GROUNDING
Filed June 10, 1950 2 SHEETS—SHEET 2

Inventor:
Hugh Krida
by Ernest C. Britton
His Attorney.

Patented June 10, 1952

2,600,304

UNITED STATES PATENT OFFICE 2,600,304

SUBSTITUTE UNIT FOR CIRCUIT TESTING AND GROUNDING

Hugh Krida, Upper Darby, Pa., assignor to General Electric Company, a corporation of New York Application June 10, 1950, Serial No. 167,326

13 Claims. (Cl. 175—298)

The invention relates to electrical circuit testing and grounding apparatus, particularly of a unit type suitable for substitution for a metal-clad circuit breaker unit in a high voltage polyphase power system wherein buses, feeder lines, tie lines, transformers, generators and other apparatus are interconnected and protected by means of the circuit breaker units, each having the usual disconnect contacts that separate coincidental to removal of the unit from its stationary cubicle.

The principal object is to provide a selective circuit testing and grounding unit that may temporarily be substituted for any circuit breaker unit in such system so that both of the circuits normally interconnected by the circuit breaker unit may be readily tested for ascertaining a line or dead circuit condition and either circuit as selected may be grounded to insure the safety of service men working thereon.

Another object is to provide safely insulated and readily accessible contact receptacles in the substitute unit for connecting an external source of test voltage or a suitable type of external testing device to either or both circuits in order to perform testing functions of the following nature: (1) selectively checking the presence or absence of voltage on each polyphase incoming bus or outgoing line conductor; (2) checking the relative phase sequence of the bus and line circuits or the actual phase sequence of each; (3) applying a test voltage to any bus or line conductor for the purpose of checking the insulation resistance thereof; and (4) connecting a resistance measuring device to any bus or line conductor to measure the resistance of a fault thereon in order to determine its approximate location.

Another object is to render the improved selective circuit testing and grounding substitute unit mechanically interchangeable with the metal-clad circuit breaker unit and capable of utilizing the vertical lift mechanism and disconnect contacts provided therefor in the metal-clad enclosure to insure the same safety to operating personnel during grounding or testing operations as is provided by the enclosed switchgear during normal operation.

Another object is to enable the improved substitute unit to short circuit and simultaneously ground either the three incoming polyphase bus conductors or the three outgoing polyphase line conductors without the need of any external cable connections so that the door of the metal-clad compartment can be closed and locked for absolute safety with the improved grounding and testing unit replacing the circuit breaker unit therein and with all parts of the improved unit capable of withstanding full short circuit stresses without damage if the unit should be applied to a live circuit.

Another object is to enable the improved unit to perform with a snap action its selective short circuiting and grounding functions under remote electrical control in case electric control power is available as well as to provide for manual remote control of the short circuiting and grounding functions even when electric control power is not available.

Another object is to provide adequate mechanical and electrical interlocking for the improved selective circuit testing and grounding unit so as to insure the maximum safety for operating personnel.

Figure 2:
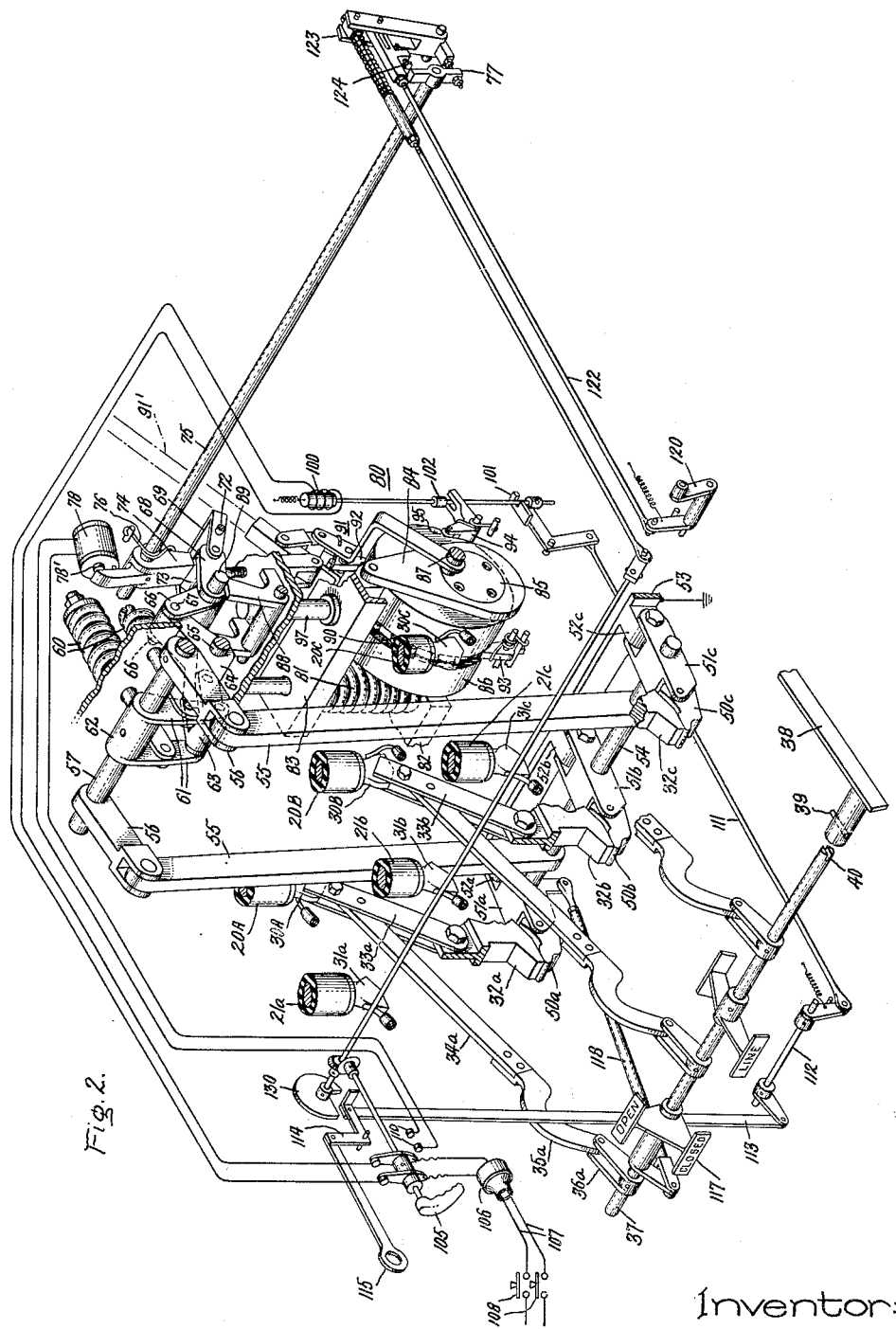

Further objects and advantages of the invention will appear in the following description of the accompanying drawing in which Fig. 1 is a perspective view of the improved selective circuit testing and grounding substitute unit ready for elevating into the connected operating position inside the metal enclosing cubicle from which the normally housed polyphase high voltage power circuit breaker has been temporarily removed. Fig. 2 is a schematic perspective exploded view showing the essential operating elements of the unit, and Fig. 3 shows an improved double-prong testing "hot stick" adapted for use with the improved unit.

As shown in Fig. 1, the improved selective circuit testing and grounding substitute unit indicated generally by the reference character 10 is mounted on a truck 11 provided with suitable rollers 12 so that the unit 10 may be readily rolled into any desired metal-clad cubicle compartment 13 as a temporary substitute for a high voltage power circuit breaker unit of the disconnectably removable type. Thus, the metal-clad cubicle 13 is shown provided with a polyphase series of disconnect receptacles or sockets 14A, 14B and 14C that are electrically connected as indicated schematically in the drawing to the corresponding line conductors A, B and C as well as a corresponding polyphase series of disconnect receptacles or sockets 15a, 15b, 15c for electrical connection to the bus conductors a, b and c. It will be understood that the power circuit breaker unit normally housed within the metal-clad cubicle 13 serves to connect or disconnect the line conductors with the bus conductors, and may be provided with suitable automatic controls for affording conventional protection to the lines. In order to cooperate in providing a positive low-resistance ground path for the improved testing and grounding unit of the present invention, the metal-clad cubicle 13 is provided with a special grounding contact shoe 16 that is connected with the permanently grounded cubicle structure as indicated.

The improved testing and grounding unit 10 has the two juxtaposed polyphase series of bushing insulated connection plugs 20A, 20B, 20C and 21a, 21b, 21c projecting in alignment upwardly therefrom for engagement respectively with the corresponding polyphase series of line and bus connection receptacles or sockets 14a, 14b, 14c and 15a, 15b, 15c when the safety unit 10 is raised into its operating position inside the cubicle 13 by means of the usual circuit breaker lifting mechanism 23 engaging with the ledges 24 provided on opposite sides of the unit 10. During such elevation, the elongated ground connector 22 of the unit electrically contacts the grounding shoe 16 of the cubicle so as to set up an adequate ground path in the event that either the line conductors or the bus conductors are to be selectively grounded by the selective grounding switch mechanism within the unit 10 in the manner explained more in detail hereinafter.

As indicated in Fig. 1, the unit 10 is provided with a lower series of three bus test plug receptacles 25a, 25b and 25c as well as an upper series of three line test plug receptacles 26A, 26B, 26C disposed in predetermined equally spaced apart alignment and each of which (although only one is actually shown) is separately interconnected by means of a suitable insulated cable conductor 27 with its corresponding one of the main connection plugs 20A, B and C and 21a, b and c. Thus, these two series of readily accessible test plug receptacles enable the necessary testing of the bus and line conductors, either singly or jointly, to be accomplished conveniently and safely. Thus, an improved glow tube type high voltage detector constructed like a double-prong fork as shown in Fig. 3 may be used to detect selectively the voltage condition across any adjacent pair of bus and line conductors. A single rod-like device is commonly known as a "hot stick." In the present instance, the test device is shown as comprising a crosshead in the form of an electrostatic glow tube 28 having the projecting terminal plugs or prongs 28' and an insulating handle 29. The projecting terminal plugs or prongs 28' are suitably spaced the same distance as that separating the adjacent receptacles to permit simultaneously contacting any two adjacent test receptacles for checking voltage differences across corresponding phase conductors to determine whether the relative phase sequence and the phasing of the two circuits are correct. As shown, one of the two terminal plugs 28'' is constructed so as to be separately rotatable about the cross-head portion as indicated so that it can be turned to a non-operative position so that the device then becomes a single "hot stick" for contacting any single conductor with the remaining fixed terminal plug so as to determine the presence or absence of voltage on any conductor preliminary to grounding the circuit. Furthermore, insulated cables having terminal plugs which fit into the test receptacles may be used as temporary connections to either the bus or line conductors for applying test voltages thereto or for serving as connections therefrom to resistance measuring equipment suitable for determining the proximity of faults or to external checking or testing apparatus containing potential transformers with required secondary devices for checking voltage, phase sequence, etc. as may be desired. For protectively shielding the test receptacles 25a, b and c or 26A, B and C when they are not being used, a hinged cover 10' is provided and arranged for locking in the closed position as shown, thus effectively blocking access to the test receptacles except during an intentional testing operation.

As indicated in Fig. 2, each of the bushing insulated connection plugs 20A, 20B, 20C (line), and 21a, 21b and 21c (bus) projecting in predetermined spaced apart alignment from the unit 10 carries at its inner end in conducting relation therewith a corresponding one of the stationary switch contacts 30A, 30B and 30C (line) and 31a, 31b and 31c (bus) which are thus mounted in predetermined spaced apart alignment. A series of intermediate stationary switch contacts 32a, 32b and 32c are separately mounted in corresponding spaced apart alignment inside unit 10, and each intermediate contact has connected in conducting relation therewith a corresponding one of the jointly movable switch members 33a, 33b and 33c for selective engagement with either of a corresponding pair of the connection plug mounted stationary switch contacts. As shown, the movable switch member 33a is pivotally mounted directly on the intermediate switch contacts 32a, b, c, respectively, and the spacing is such that blades 33a, b and c can engage with either of the pair of stationary switch contacts 30A or 31a depending upon the position to which the switch member 33a is selectively operated. Each of the other jointly movable selective switch members 33b and 33c is mounted to operate in a similar manner.

The movable switch member 33a is selectively operated between its two circuit-closing positions by means of the pivotally connected insulation link 34a that is connected by the yoke 35a to be moved by the clevis 36a fixed to the operating shaft 37. Each of the other selective switch members 33b and 33c is similarly connected to be jointly operated with the selective switch member 33a upon rotation of the operating shaft 37. As shown, shaft 37 is rotated by means of the removable manual operating handle 38 provided with the pin 39 for engaging with the slotted end 40 of the operating shaft. As shown in Fig. 1, a double key shaped opening 41 is provided in the side of the enclosing casing of the unit 10 for interlocking engagement with the projecting end of the pin 39 so that the manual selective switch operating handle 38 can be removed only after the joint operation of the selective gang operated switch members 33a, 33b and 33c to either circuit closing position is completed.

For positively and instantaneously grounding either the three-phase bus or the three-phase line, whichever has been selected, a series of grounding switch resilient contacts 50a, 50b and 50c are pivotally mounted on the switch members 51a, 51b and 51c that in turn are pivotally mounted in conducting relation on the hinge blocks 52a, 52b and 52c which may be brazed on the common ground bus 53. As shown in Fig. 1, bus 53 is connected to the external ground connector 22 thereby constituting a direct low-resistance ground path via fixed shoe 16. The ground switch members 51a, 51b and 51c are interconnected for joint operation by the common operating bar 54 on which the pair of links 55 are pivoted for operation by the clevis arms 56 that are pinned or otherwise fixed to their common operating shaft 57. This grounding switch operating shaft 57 is normally biased to operate the grounding switch contacts 50a, 50b and 50c to the open position by means of a plurality of biasing springs 60 connected through the links 61 with the double-armed actuating crank 62 that is fixedly pinned to the shaft 57.

The grounding switch contacts 50a, 50b and 50c preferably are closed with a snap action by means of a spring-charged mechanism 80 and a compound toggle mechanism comprising the link 63 that is pivotally supported between the arms of the crank 62 and is pivotally interconnected with one end of the bell crank member 64 that is pivotally mounted on the fixed shaft 65. The other end of the bell crank 64 is connected to the toggle links 66 which in turn are connected by pin 67 and the toggle links 68 with the U-shaped guide link 69 that is pivotally mounted on the fixed shaft 72. A latch roller 73 carried between the ends of the toggle links 68 is engaged by a latch 74 mounted on the laterally extending trip shaft 75 and biased by spring 76 into a position to engage with the latch roller 73. An interlock pawl 77 is carried on the right-hand end of the trip shaft 75. The latch 74 may be released or tripped by the plunger 78' of the tripping electromagnet 78 upon energization thereof, and the tripping of latch 74 enables the biasing springs 60 to operate the three grounding switch contacts 50a, 50b and 50c to the open position with a snap action upon the resulting collapse of the compound toggle mechanism.

A spring-charged mechanism, indicated generally by the reference character 80, may be provided for operating the compound trip-free toggle mechanism with a snap action to close the grounding switch contacts 50a, 50b and 50c when the latch 74 engages with the latch roller 73 although it will be understood that other forms of snap action closing mechanisms may be used if desired. For providing the closing thrust, the spring-charged mechanism 80 is provided with a pair of energy-accumulating springs 81 that are compressible between the fixed support 82 and the movable channel-sectioned cross head 83 although only the far side spring is shown in order more clearly to reveal other details of construction. The movable cross head 83, suitably guided for reciprocal vertical movement, is operatively connected by a pair of eccentric followers 84 for the eccentrics 85 which are fixed to the opposite ends of the heavy flywheel 86 which is mounted for rotation on the shaft 87 having suitable fixed bearings (not shown). Accordingly, any reciprocating movement of the cross head is accompanied by corresponding rotation of the flywheel 86 and vice versa. The flywheel 86 preferably is provided with a peripheral groove 90 within which a roller chain is located and fixedly secured to the flywheel.

A manually operable ratchet mechanism 91 is provided with a pawl 92 for successively engaging with the roller links of the chain to advance the flywheel 86 step by step in a clockwise direction to the position in which it is shown so as to charge the energy-accumulating springs 81. A latching pawl 93 engages with a roller link of the chain at the end of each step of the manual charging operation so as to prevent reverse rotation of the flywheel 86. As soon as the eccentric 85 is carried over center, the energy stored in springs 81 thereupon tends to rotate flywheel 86 in the clockwise direction, but the releasable latch 94 engages with a notch 95 formed in the periphery of the flywheel 86 and thereby latches the spring-charged mechanism 80 against the further release of the energy stored in the springs 81. The cross head 83 carries an operating plunger 97 for engaging with the knee of the toggle formed by the links 66 and 68 so as to extend this toggle while the latch 74 engages with the latch roller 73 and thereby move the arm 64 to operate through link 63 to rotate the clevis member 62 and shaft 57 to quickly close the grounding switch contacts 50a, 50b and 50c upon release of the latch 94 and resulting release of the energy stored in the springs 81. The toggle mechanism is latched in the closed position in which it is shown by the engagement of the double latch 88 with the ends of pin 89 at the knee of the toggle.

As shown in Fig. 2, provision is made for releasing the latch 94 to close the grounding switch contacts with a snap action either by energizing the releasing electromagnet 100 or manually operating the releasing arm 101. In either case, the collar 102 engages with the bifurcated end of the latch 94 to effect the quick release of the energy stored in the springs 81. The releasing electromagnet 100 is arranged to be energized through a circuit controlled by the manually operable selector switch 105 which is connected to a plug receptacle 106 mounted on the front of the unit 10 as shown in Fig. 1 and arranged to be connected to a suitable source of power by a cable 107 provided with the two separately operable push button switches 108 for remote electrical control. When the selector switch 105 is moved from the position in which it is shown in Fig. 2 to its other position in which contacts 110 are engaged, then the closure of the push buttons 108 serves to energize the trip coil 78 and thereby open the grounding switch contacts.

The manual release arm 101 is mechanically connected by rod 111, shaft 112, link 113, bell crank 114, with the manual release handle 115 that is provided with a suitable opening for receiving a hook attached to a lanyard to permit remote control of the manual release arm 101 to close the grounding contacts when such remote operation is desired. A suitable indicator 117 is rotatably mounted on shaft 37 and connected by the rod 118 with the movable grounding switch member 51a so as to indicate whether the grounding switch is opened or closed from the front of the unit 10 as indicated in Fig. 1. Also, transparent side panels 119 are provided for facilitating inspection and checking of the selector and grounding switch mechanism mounted inside the unit 10.

Interlocking mechanism is provided for insuring the maximum safety in the operation of the improved testing and grounding unit 10. As previously pointed out, the selector switches 33a, 33b and 33c necessarily must be completely operated into a selected circuit closing position before the manual selector switch operating handle 38 can be removed, and this handle necessarily must be removed before the unit 10 can be rolled into the cubicle 13 and operated by the elevating mechanism 23 into the connected position. This serves in effect as an interlock to insure that the selective switch can never be operated while the substitute unit is in its connected position but only before or after the substitution of the unit for the circuit breaker. Likewise, the spring-charged mechanism 80 necessarily must be manually charged before the unit 10 is inserted in the cubicle 13 and the manual spring charging handle 91' removed. Normally the grounding switch contacts 50a, 50b and 50c are in the open position when unit 10 is inserted in the cubicle 13. However, the automatic interlocking trip lever 120 is provided for engaging with the cam 121 that is fixed to the side of the cubicle 13 for insuring that the grounding switch must be in the open position before the unit 10 can be raised to its connected position. Thus, automatic trip lever 120 is connected by the rod 122 with the pivot arm 123 carried on the unit and having the adjustable stop 124 for engaging with the interlock pawl 77 to release the trip latch 74 from the latch roller 73 and thereby collapse the compound toggle mechanism to open the grounding contacts 50a, 50b and 50c. But the operation of the automatic trip lever 120 normally will produce no effect since the grounding switch contacts are normally open when unit 10 is elevated into its connected position.

With the improved unit 10 in its connected position inside the cubicle 13 and with the spring-charged mechanism 80 charged, the latter may be released electrically in the manner previously described as long as the manual selector switch 105 remains in the position in which it is shown in Fig. 2 and a suitable source of outside power is available. In case there is no such power source available, then the manual release handle 115 may be operated to effect the release of the spring-charged mechanism 80 to effect closing of the grounding switch contacts 50a, 50b and 50c with a snap action so as to ground the particular set of bus or line conductors which the selector switches 33a, 33b and 33c interconnect with the grounding switch intermediate stationary contacts 32a, 32b and 32c as selected before the unit was inserted in the cubicle 13.

The grounding switch may be opened with a snap action to remove the ground from the conductors by operating the selector switch 105 to its other position in which the contacts 110 are engaged so as to permit energizing the trip coil 78 from the remote push button. Thereupon, the plunger 78' releases the latch 74 thereby collapsing the compound toggle mechanism to permit the biasing spring 60 to open the grounding switch contacts with a snap action. Under these conditions, the interlocking cam 130 is rotated sufficiently to disable the manual release handle 115.

In case no suitable external source of power is available for energizing the trip coil 78, then trip lever 120 may be operated manually, thereby effecting manual release of the trip latch 74 to open the grounding switch contacts with a snap action.

What I claim as new and desire to secure by Letters Patent of the United States, is:

1. A selective circuit grounding substitute unit having in combination a double throw circuit selective switch, a single throw grounding switch having biasing means for opening the switch and connections with the selective switch for grounding the circuit selected thereby, an energy accumulating spring closing mechanism having a remotely operable releasing control element for closing the grounding switch with a snap action and separately controlled latching means for holding the grounding switch closed and releasing the grounding switch for snap action opening by the biasing means.

2. A selective circuit grounding substitute unit having in combination a pair of separately insulated stationary switch contacts each having means for connection with a separate circuit upon substitution of the unit, an intermediate separately insulated stationary switch contact having a movable switch member electrically interconnected therewith and provided with operating means interlocked to be effective only before and after substitution of the unit for selectively and separately connecting the intermediate contact with each of the pair of contacts, a grounded switch member engageable with the intermediate contact for grounding the same, spring means biasing the grounding switch member to the opening position, energy storing spring means for closing the grounded switch member with a snap action, latching means for holding the grounded switch member closed, and latch tripping means for releasing the grounded switch member for snap action opening by the biasing spring means.

3. A selective circuit grounding substitute unit having in combination a pair of stationary switch contacts, each having means for connection with a separate circuit upon movement of the unit to a predetermined position, an intermediate stationary switch contact having a switch member electrically interconnected therewith and provided with interlocking means for rendering the switch member movable selectively into circuit closing engagement with either of the pair of contacts only before and after movement of the unit to the predetermined position, a reversely movable grounding switch member having means for grounding the member upon movement of the unit to the predetermined position, means biasing the grounding switch member for movement in one direction, energy storing means for effecting snap action movement of the grounding switch member in the opposite direction into engagement with the intermediate contact for grounding the same, latching means for holding the switch in engagement with the intermediate contact independently of the energy storing means, and latch tripping means for controlling the snap action disengagement of the grounding switch member from the intermediate contact in accordance with its bias.

4. A selective circuit grounding substitute unit for plural circuit apparatus having separate circuit connection sockets and a separate grounding terminal, said unit having in combination a pair of stationary switch contacts each having means for connection with a separate circuit including a disconnect plug electrically connected with the contact for engaging a corresponding socket upon movement of the unit to a predetermined position, an intermediate stationary switch contact provided with a movable switch member and having operating means interlocked to be effective only before and after substitution of the unit for selectively and separately connecting the intermediate contact with each of the pair of contacts, a separately operable switch member having an interconnected conducting shoe for engaging the grounding terminal upon movement of the unit to the predetermined position and separately releasable remotely controlled spring biasing means for operating the separately operable switch member with a snap action into and out of circuit closing engagement with the intermediate contact.

5. A selective circuit grounding substitute unit having in combination a pair of stationary switch contacts each having means for connection with a separate circuit upon movement of the unit to a predetermined position, an intermediate stationary switch contact provided with a selectively movable switch member for selectively and separately connecting the intermediate contact with each of the pair of contacts, means including a grounding switch member having means for grounding the switch member upon movement of the unit to the predetermined position, releasable means effective only for operating the grounding switch member with a snap action into engagement with the intermediate contact for grounding the same, latching means for independently holding the grounding switch member in engagement with the intermediate contact, and spring biasing means for operating the grounding switch member with a snap action out of engagement with the intermediate contact upon release of the latching means.

6. A selective polyphase circuit grounding substitute unit having in combination a plurality of pairs of stationary switch contacts, each having means for connection with a corresponding polyphase circuit conductor upon movement of the unit to a predetermined position, a corresponding plurality of intermediate stationary switch contacts each provided with a selectively movable switch member for separately connecting each intermediate contact with either of the corresponding pair of contacts, means for jointly moving the selective switch members to each selected connecting position only before and after movement of the unit to the predetermined position, means including a corresponding plurality of grounding switch members having common means for grounding each switch member upon movement of the unit to the predetermined position and each engageable with a corresponding intermediate contact for grounding the same, a remotely releasable energy storing spring means for jointly operating the grounding switch members into engagement with the intermediate stationary switch contacts, latching means for independently holding the grounding switch members in engagement with the intermediate stationary switch contacts, and spring biasing means for operating the grounding switch members with snap action out of engagement with the intermediate stationary switch contacts upon release of the latching means.

7. A selective circuit grounding substitute unit for operation in a switchgear cubicle having separate circuit disconnect plug receptacles and a ground terminal therein, said unit having in combination a plurality of connection plugs projecting in alignment therefrom for engaging with the disconnect receptacles upon a predetermined movement of the unit in the cubicle and having each plug provided with a stationary switch contact at the inner end thereof, a plurality of intermediate stationary switch contacts each having a selective switch member pivotally mounted thereon and movable selectively into circuit closing engagement with either of a corresponding pair of the stationary switch contacts, means including a removable operating handle having operative connection with the selective switch members only when the unit is outside the cubicle for operating the selective switch members to a selected position, and a plurality of grounding switch members having a common connection engageable with the ground terminal inside the cubicle and remotely releasable energy storing spring means having connections effective only for operating the grounding switch members with a snap action into engagement with the corresponding intermediate stationary switch contacts for grounding the same, latching means for independently holding the ground switch members in engagement with the intermediate switch contacts, and spring biasing means for operating the grounding switch members with a snap action out of engagement with the intermediate switch contacts upon release of the latching means.

8. A selective circuit grounding substitute unit for operation in a switchgear cubicle having separate circuit disconnect plug receptacles and a ground terminal therein, said unit having in combination a plurality of connection plugs projecting in alignment therefrom for engaging with the disconnect receptacles upon a predetermined movement of the unit in the cubicle and having each plug provided with a stationary switch contact at the inner end thereof, a plurality of intermediate stationary switch contacts each having a selective switch member pivotally mounted thereon and movable selectively into circuit closing engagement with either of a corresponding pair of the stationary switch contacts, means including a removable operating handle having operative connection with the selective switch members only when the unit is outside the cubicle for operating the selective switch members to a selected position, a plurality of grounding switch members having a common connection engageable with the ground terminal inside the cubicle, and an energy accumulating spring operating mechanism having a remotely operable releasing control element for jointly operating the grounding switch members with a snap action into circuit closing engagement with the intermediate stationary switch contacts for grounding the same, latching means for independently holding the grounding switch members in engagement with the intermediate stationary switch contacts, and spring biasing means for operating the grounding switch members with a snap action out of engagement with the intermediate stationary switch contacts upon release of the latching means.

9. A selective circuit grounding substitute unit having in combination a plurality of circuit connection plugs projecting in alignment therefrom and each provided with a stationary switch contact at the inner end thereof, a plurality of intermediate stationary switch contacts each having a switch member pivotally mounted thereon and movable selectively into circuit closing engagement with either of a corresponding pair of the stationary switch contacts, a plurality of grounding switch members having a grounding connection and engageable with the intermediate stationary switch contacts for grounding the same, means including a spring charged mechanism having a remote electrically operable releasing element and a remote mechanically operable releasing element for jointly operating the grounding switch members with a snap action into engagement with the intermediate stationary switch contacts for grounding the same, a holding latch for independently holding the grounding switch members in engagement with the intermediate stationary switch contacts and having a remote electrically operable releasing element and a remote mechanically operable releasing element, and spring biasing means for operating the grounding switch members with a snap action out of engagement with the intermediate stationary switch contacts upon release of the latch.

10. A selective circuit grounding unit having in combination a plurality of circuit connection plugs projecting in alignment therefrom and each provided with a stationary switch contact at the inner end thereof, a plurality of intermediate stationary switch contacts each having a switch member pivotally mounted thereon and movable selectively into circuit closing engagement with either of a corresponding pair of the stationary switch contacts, a plurality of grounding switch members having a grounding connection and engageable with the intermediate stationary switch contacts for grounding the same, means including a spring charged mechanism having a remote electrically operable releasing element and a remote mechanically operable releasing element, for jointly operating the grounding switch members into engagement with the intermediate stationary contacts for grounding the same, a holding latch for independently holding the grounding switch members in engagement with the intermediate stationary switch contacts and having a remote electrically operable releasing element and a remote mechanically operable releasing element, and spring biasing means for operating the grounding switch members with a snap action out of engagement with the intermediate stationary switch contacts upon release of the latch, and selective interlocking means for rendering both the mechanically operable releasing elements and the electrically operable releasing elements effective or ineffective.

11. A selective circuit testing and grounding substitute unit for a drawout switchgear cubicle having inclosed circuit disconnect plug receptacles and a ground terminal inside thereof, said unit having in combination a plurality of connection plugs projecting therefrom for circuit closing engagement with the disconnect receptacles upon movement of the unit inside the cubicle and having each plug provided with a stationary switch contact at the inner end thereof, a plurality of test plug receptacles carried on the front of the unit and each having a circuit connection with a corresponding stationary switch contact, a plurality of intermediate insulated switch contacts mounted on the unit and each having a switch member pivotally mounted thereon and movable selectively into circuit closing engagement with either of a corresponding pair of the stationary switch contacts, selective operating means effective only when the unit is outside a cubicle for jointly operating the movable switch members to a circuit selective position, and a plurality of grounding switch members having a common connection engageable with the ground terminal upon movement of the unit inside a cubicle and provided with means for jointly operating the grounding switch members into engagement with the intermediate switch contacts of the unit for grounding the same.

12. A selective circuit testing substitute unit for a drawout switchgear cubicle having a plurality of inclosed circuit disconnect plug receptacles, said unit having in combination a plurality of connection plugs projecting in alignment therefrom for circuit closing engagement with the disconnect receptacles upon movement of the unit inside the cubicle, a plurality of test plug receptacles carried in predetermined equally spaced-apart alignment on the front of the unit and each having a circuit connection with a corresponding connection plug, and a double pronged terminal testing device having the terminal prong spacing thereof corresponding to the spacing of said test receptacles for selectively interconnecting the testing device therebetween.

13. A selective circuit testing substitute unit for a drawout switchgear cubicle having inclosed circuit disconnect plug receptacles, said unit having in combination a plurality of connection plugs projecting in alignment therefrom for circuit closing engagement with the disconnect receptacles upon movement of the unit inside the cubicle, a plurality of test plug receptacles carried in predetermined equally spaced-apart alignment on the front of the unit and each having a circuit connection with a corresponding connection plug, and a double pronged terminal testing device having the terminal prong spacing thereof corresponding to the spacing of said test receptacles for selectively interconnecting the testing device therebetween, and provided with means for rotatably mounting one of the terminal prongs for movement to an inactive position.

HUGH KRIDA.

REFERENCES CITED

The following references are of record in the file of this patent:

UNITED STATES PATENTS

| Number | Name | Date |
|---|---|---|
| 1,576,347 | Mirrey | Mar. 9, 1926 |
| 1,782,594 | Allen | Nov. 25, 1930 |
| 2,353,518 | Specht | July 11, 1944 |
| 2,504,775 | Wood | Apr. 18, 1950 |

FOREIGN PATENTS

| Number | Country | Date |
|---|---|---|
| 387,384 | Great Britain | Feb. 6, 1933 |